(12) United States Patent
Lin et al.

(10) Patent No.: US 11,218,648 B2
(45) Date of Patent: Jan. 4, 2022

(54) VIDEO STICKER PROCESSING METHOD AND DEVICE

(71) Applicant: Sunday Morning Technology (Guangzhou) Co., Ltd., Guangdong (CN)

(72) Inventors: Qianya Lin, Guangdong (CN); Tian Xia, Guangdong (CN); RemyYiYang Ho, Guangdong (CN); Si Chen, Guangdong (CN); Zishan Huang, Guangdong (CN); Rongchan Liu, Guangdong (CN)

(73) Assignee: Sunday Morning Technology (Guangzhou) Co., Ltd., Guangzhou (CN)

( * ) Notice: Subject to any disclaimer, the term of this patent is extended or adjusted under 35 U.S.C. 154(b) by 0 days.

(21) Appl. No.: 16/935,167

(22) Filed: Jul. 21, 2020

(65) Prior Publication Data

US 2021/0329176 A1   Oct. 21, 2021

(30) Foreign Application Priority Data

Apr. 15, 2020   (CN) .......................... 202010297623.5

(51) Int. Cl.
| | | |
|---|---|---|
| *H04N 5/93* | (2006.01) | |
| *G11B 27/00* | (2006.01) | |
| *H04N 5/92* | (2006.01) | |
| *G06K 9/00* | (2006.01) | |
| *H04N 5/265* | (2006.01) | |

(Continued)

(52) U.S. Cl.
CPC ......... *H04N 5/265* (2013.01); *G06K 9/00288* (2013.01); *G06K 9/00711* (2013.01); *G06T 7/70* (2017.01); *G10L 15/26* (2013.01); *G10L 25/57* (2013.01); *G11B 27/036* (2013.01); *H04N 5/278* (2013.01); *G06T 2207/10016* (2013.01); *G06T 2207/30201* (2013.01)

(58) Field of Classification Search
USPC ........ 386/285, 278, 280, 326; 382/103, 118, 382/115
See application file for complete search history.

(56) References Cited

U.S. PATENT DOCUMENTS

9,639,251 B2 *  5/2017  Lee .................... G06F 16/7844
10,446,189 B2 * 10/2019  Zukerman ............... G06T 11/60
(Continued)

*Primary Examiner* — Daquan Zhao (57) ABSTRACT

The present invention provides a video sticker processing method and device. The method comprises: performing face recognition and speech recognition on video to be processed separately to obtain face position data when face recognition is successful, and speech recognition text when speech recognition is successful; matching speech recognition text with description text of each sticker in sticker library to obtain a target sticker, and obtaining a target video frame according to speech recognition text; adding target sticker to default position or target position of target video frame; wherein, target position is calculated according to the face position data. The present invention can automatically determine the target sticker and its added position according to the face recognition result and the speech recognition result of the video to be processed, realize the intelligent selection and placement of the target sticker, and improve the processing efficiency of the video sticker.

10 Claims, 3 Drawing Sheets

(51) Int. Cl.
*G06T 7/70* (2017.01)
*G11B 27/036* (2006.01)
*G10L 15/26* (2006.01)
*G10L 25/57* (2013.01)
*H04N 5/278* (2006.01)

(56) References Cited

U.S. PATENT DOCUMENTS

2002/0054047 A1* 5/2002 Toyama ............... H04N 7/147
  345/629
2014/0112534 A1* 4/2014 Sako ................ G06F 21/6245
  382/103

* cited by examiner

VIDEO STICKER PROCESSING METHOD AND DEVICE

CROSS-REFERENCE TO RELATED APPLICATIONS

The present application claims the benefit of Chinese Patent Application No. 202010297623.5 filed on Apr. 15, 2020. The contents of the above are hereby incorporated by reference.

FIELD OF THE INVENTION

The invention relates to the technical field of video processing, and in particular to a video sticker processing method and device.

BACKGROUND OF THE INVENTION

Since video social networking has become an emerging social networking method, a variety of video editing software has emerged. In order to enhance the entertainment effect of the video, users often use video editing software to add stickers to the video. In practical applications, the user manually selects the target sticker from the sticker library according to personal preference, manually selects the target video frame from the video frame of the video, and manually adjusts the placement of the target sticker after adding the target sticker to the target video frame, in order to render the target sticker in the target video frame during the video playback. Since the prior art requires the user to manually process the video sticker, the processing time of the video sticker is increased, resulting in a low processing efficiency of the video sticker.

SUMMARY OF THE INVENTION

In order to overcome the defects of the prior art, the present invention provides a video sticker processing method and device, which can automatically determine the target sticker and its added position according to the face recognition result and speech recognition result of the video to be processed, and realize intelligent selection and placement of the target stickers to improve the efficiency of video sticker processing.

In order to solve the above technical problems, in a first aspect, an embodiment of the present invention provides a video sticker processing method, which comprises:

performing face recognition and speech recognition on the video to be processed separately to obtain face position data when face recognition is successful, and speech recognition text when speech recognition is successful;

matching the speech recognition text with the description text of each sticker in the sticker library to obtain a target sticker, and obtaining a target video frame according to the speech recognition text;

adding the target sticker to the default position or target position of the target video frame; wherein, the target position is calculated according to the face position data.

Further, performing face recognition and speech recognition on the video to be processed separately to obtain face position data when face recognition is successful, and speech recognition text when speech recognition is successful, specifically as follows:

performing face recognition on the video frames of the video to be processed in sequence, and when face recognition is successful in a video frame, obtaining the face position data of the corresponding video frame;

performing speech recognition on the video to be processed, and when speech recognition is successful, convert the recognized speech data into text data to obtain the speech recognition text.

Further, matching the speech recognition text with the description text of each sticker in the sticker library to obtain a target sticker, and obtaining a target video frame according to the speech recognition text, specifically as follows:

matching the text word obtained by cutting the speech recognition text with the description text of each sticker in the sticker library to obtain the target sticker;

obtaining the appearance time of the speech recognition text in the video to be processed, and taking a video frame whose playback time corresponds to the appearance time as the target video frame.

Further, adding the target sticker to the default position or target position of the target video frame further comprises:

when the appearance time of the target sticker at the default position or the target position reaches a preset threshold, removing the target sticker.

Further, after performing face recognition and speech recognition on the video to be processed separately to obtain face position data when face recognition is successful, and speech recognition text when speech recognition is successful, the method further comprises:

adding the speech recognition text at the subtitle position of the target video frame.

In a second aspect, an embodiment of the present invention provides a video sticker processing device, which comprises:

face and speech recognition module, which is configured to perform face recognition and speech recognition on the video to be processed separately to obtain face position data when face recognition is successful, and speech recognition text when speech recognition is successful;

target sticker obtaining module, which is configured to match the speech recognition text with the description text of each sticker in the sticker library to obtain a target sticker, and obtain a target video frame according to the speech recognition text;

target sticker adding module, which is configured to add the target sticker to the default position or target position of the target video frame; wherein, the target position is calculated according to the face position data.

Further, performing face recognition and speech recognition on the video to be processed separately to obtain face position data when face recognition is successful, and speech recognition text when speech recognition is successful, specifically as follows:

performing face recognition on the video frames of the video to be processed in sequence, and when face recognition is successful in a video frame, obtaining the face position data of the corresponding video frame;

performing speech recognition on the video to be processed, and when speech recognition is successful, convert the recognized speech data into text data to obtain the speech recognition text.

Further, matching the speech recognition text with the description text of each sticker in the sticker library to obtain a target sticker, and obtaining a target video frame according to the speech recognition text, specifically as follows:

matching the text word obtained by cutting the speech recognition text with the description text of each sticker in the sticker library to obtain the target sticker;

obtaining the appearance time of the speech recognition text in the video to be processed, and taking a video frame whose playback time corresponds to the appearance time as the target video frame.

Further, the target sticker adding module is also configured to when the appearance time of the target sticker at the default position or the target position reaches a preset threshold, remove the target sticker.

Further, the video sticker processing device further comprises speech recognition text adding module, which is configured to after performing face recognition and speech recognition on the video to be processed separately to obtain face position data when face recognition is successful, and speech recognition text when speech recognition is successful, add the speech recognition text at the subtitle position of the target video frame.

The embodiments of the present invention has the following beneficial effects:

the embodiments of the present invention perform face recognition and speech recognition on the video to be processed separately to obtain face position data when face recognition is successful, and speech recognition text when speech recognition is successful, and then match the speech recognition text with the description of each sticker in the sticker library to obtain the target sticker, and the target video frame is obtained according to the speech recognition text, so that the target sticker is added at the default position of the target video frame or the target position obtained by calculating the face position data to complete the video sticker processing. Compared with the prior art, the embodiments of the present invention perform face recognition and speech recognition on the video to be processed, so that when the speech recognition is successful, the speech recognition text is matched with the description text of each sticker in the sticker library to obtain the target sticker, and obtain the target video frame according to the speech recognition text. When face recognition fails, add the target sticker to the default position of the target video frame according to the preset position for the target sticker. When the face recognition is successful, the target position is calculated according to the face position data, and the target sticker is added to the target position of the target video frame. The embodiment of the present invention can automatically determine the target sticker and its added position according to the face recognition result and the speech recognition result of the video to be processed, realize the intelligent selection and placement of the target sticker, and improve the processing efficiency of the video sticker.

DETAILED DESCRIPTION OF THE INVENTION

Embodiments of the present invention are further explained clearly and completely as follows in conjunction with figures. Obviously, the described embodiments are only a part of the embodiments of the present invention, not all of the embodiments. Based on the embodiments in the present invention, all other embodiments obtained by those skilled in the art without creative labor belong to the scope of protection of the present invention.

It should be noted that the step numbers in the text are only for the convenience of explanation of specific embodiments, and are not intended to limit the execution order of the steps. The method provided in this embodiment may be executed by a related server, and the following uses the server as an execution subject for example.

Figure 1:
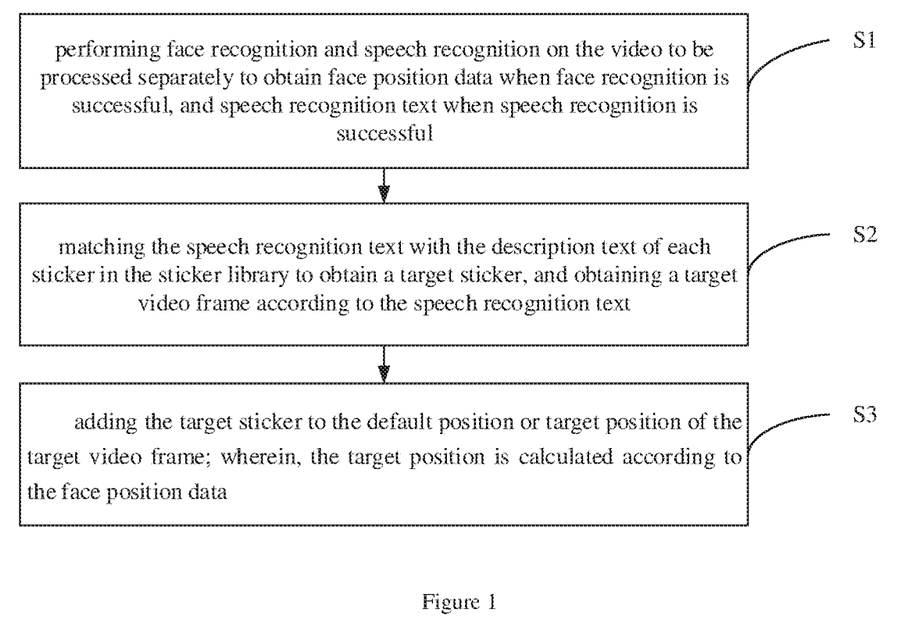
FIG. 1 is a schematic flow diagram of a video sticker processing method according to a first embodiment of the present invention.
Figure 2:
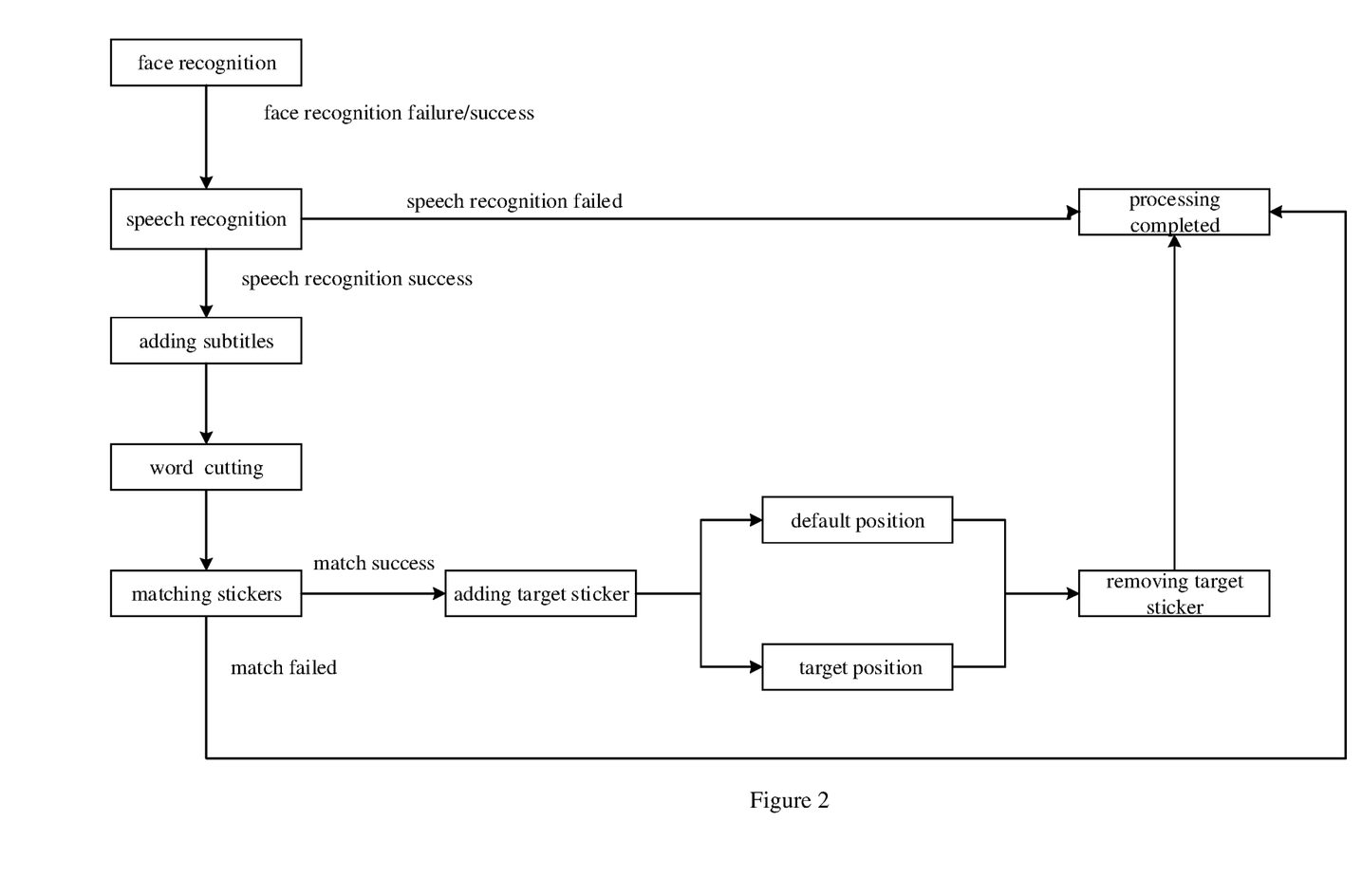
FIG. 2 is another schematic flow diagram of a video sticker processing method according to a first embodiment of the present invention.

Refer to FIGS. 1-2.

As shown in FIG. 1-FIG. 2, a first embodiment provides a video sticker processing method, which comprises steps S1-S3:

S1, performing face recognition and speech recognition on the video to be processed separately to obtain face position data when face recognition is successful, and speech recognition text when speech recognition is successful;

S2, matching the speech recognition text with the description text of each sticker in the sticker library to obtain a target sticker, and obtaining a target video frame according to the speech recognition text;

S3, adding the target sticker to the default position or target position of the target video frame; wherein, the target position is calculated according to the face position data.

As an example, the user uploads the video to be processed through the user terminal, and the server performs face recognition and speech recognition on the video to be processed when receiving the video to be processed. When the face recognition is successful, the face position data can be obtained, and when the speech recognition is successful, the speech recognition text can be obtained. Wherein, user terminals comprise mobile phones, computers, tablets and other communication devices that can be connected to the server.

In a preferred implementation of this embodiment, after obtaining the speech recognition text, the server may deliver the speech recognition text to the user terminal, so that the user can confirm the speech recognition text through the user terminal.

When the speech recognition is successful, the speech recognition text is matched with the description text of each sticker in the sticker library, and the sticker corresponding to the description text successfully matched with the speech recognition text is the target sticker. At the same time, the target video frame is obtained according to the speech recognition text.

In a preferred implementation of this embodiment, after obtaining the target sticker, the server can deliver the target sticker to the user terminal, so that the user can confirm the target sticker through the user terminal. After obtaining the target video frame, the server can deliver the target video frame to the user terminal, so that the user can confirm the target video frame through the user terminal.

After obtaining the target sticker and the target video frame, the location of the target sticker is determined by combining the face recognition result, that is, when face recognition fails, add the target sticker to the default position of the target video frame according to the preset position for the target sticker, and when the face recognition is successful, the target position is calculated according to the face position data, and the target sticker is added to the target position of the target video frame.

Wherein, the setting process of the default position can be referred to: when the face recognition of the video to be processed fails, that is, when the face cannot be recognized or the rectangular width of the face is less than 30% of the width of the mobile phone screen, first add a 300*380 default rectangle to the center of the phone screen, then draw the inscribed ellipse of the default rectangle, the point on the inscribed ellipse is the default effective point, and finally randomly select a default effective point from all the default effective points as the default position.

Wherein, the calculation process of the target position can refer to: when the face recognition of the video to be processed is successful, that is, the width of the face rectangle is greater than 30% of the width of the mobile phone screen, firstly, the width of the face rectangle is increased by 40%, the upper half of the face rectangle is increased by 60%, and the lower half of the face rectangle is increased by 30%, to ensure that the width of the entire face rectangle is not less than 65% of the width of the mobile phone screen. Then draw the inscribed ellipse of the face rectangle. The points on the ellipse are the spare points of the target sticker (equally divided into 8-10). The spare points outside the screen of the mobile phone are unavailable points, and the spare points inside the screen of the mobile phone are available points. Then add a default sticker at each available point (the width of the sticker is greater than 45% of the width of the face rectangle). When the default sticker placement area exceeds the mobile phone screen by 20%, the corresponding available point is an invalid point. When the default sticker placement area does not exceed 20% of the phone screen, the corresponding available point is the valid point. Finally, randomly select a valid point from all valid points as the target position. When there are less than 3 valid points, center one width=80% playerWidth, height=70% playerHeight (rectangle of safe area), at this time, it is necessary to judge whether the height of the center point of the rectangle is higher or lower than the height of the mobile phone screen 5%, if yes, determine the valid point in the reverse direction as the target position.

Wherein, the selection process of the rotation angle of the target sticker can refer to: when the target sticker is added on the left side of the mobile phone screen, the rotation angle is a random angle of 0-45° clockwise, if the target sticker is added on the right side of the mobile phone screen, the rotation angle is a random angle of 0-45° counterclockwise.

In a preferred implementation of this embodiment, after adding the target sticker to the default position or target position of the target video frame, the server may deliver the target video frame with the target sticker added to the user terminal, so that the user can confirm the processing of the video sticker through the user terminal.

In this embodiment, face recognition and speech recognition are performed on the video to be processed separately to obtain face position data when the face recognition is successful, and speech recognition text is obtained when the speech recognition is successful, and then the speech recognition text is matched with the description text of each sticker in the sticker library to obtain the target sticker, and the target video frame is obtained according to the speech recognition text, thereby add a target sticker to the default position or the target position calculated based on the face position data of the target video frame to complete the video sticker processing.

In this embodiment, by performing face recognition and speech recognition on the video to be processed, when the speech recognition is successful, the speech recognition text is matched with the description text of each sticker in the sticker library to obtain the target sticker, and the target video frame is obtained according to the voice recognition text. When face recognition fails, add the target sticker to the default position of the target video frame according to the default position preset for the target sticker, and when the face recognition is successful, the target position is calculated according to the face position data, and the target sticker is added to the target position of the target video frame. The embodiment of the present invention can automatically determine the target sticker and its added position according to the face recognition result and the speech recognition result of the video to be processed, realize the intelligent selection and placement of the target sticker, and improve the processing efficiency of the video sticker.

In a preferred embodiment, performing face recognition and speech recognition on the video to be processed separately to obtain face position data when face recognition is successful, and speech recognition text when speech recognition is successful, specifically as follows: performing face recognition on the video frames of the video to be processed in sequence, and when face recognition is successful in a video frame, obtaining the face position data of the corresponding video frame; performing speech recognition on the video to be processed, and when speech recognition is successful, convert the recognized speech data into text data to obtain the speech recognition text.

As an example, the user records the video to be processed through the user terminal, uploads the video frames of the video to be processed, and when the server receives the video frames of the video to be processed, the video frames of the video to be processed are sequentially subjected to face recognition according to the order of receiving the video frames of the video to be processed. If the face recognition of a video frame is successful, it is determined that the face recognition of the video to be processed is successful, and the face position data of the video frame is obtained. If face recognition fails for all video frames, it is determined that face recognition of the video to be processed has failed. The user finishes recording the video to be processed through the user terminal and uploads the last video frame of the video to be processed. When receiving the last video frame, the server performs speech recognition on the video to be processed. If the speech recognition is successful, the recognized speech data is converted into text data to obtain the speech recognition text. If the speech recognition fails, the video sticker processing is exited.

In this embodiment, face recognition is performed on the video frames of the video to be processed in sequence, and the face position data of the corresponding video frame is obtained when the face recognition of a video frame is successful, so that when the user records the video to be processed, it can perform face recognition on the received video frame, and after obtaining the face position data, there is no need to perform face recognition on the remaining video frames, which greatly shortens the time of processing face recognition of the video to be processed, thereby improving the efficiency of video sticker processing.

In a preferred embodiment, matching the speech recognition text with the description text of each sticker in the sticker library to obtain a target sticker, and obtaining a target video frame according to the speech recognition text, specifically as follows: matching the text word obtained by cutting the speech recognition text with the description text of each sticker in the sticker library to obtain the target sticker; obtaining the appearance time of the speech recognition text in the video to be processed, and taking a video frame whose playback time corresponds to the appearance time as the target video frame.

As an example, after the speech recognition text is obtained, the server performs word cutting on the speech recognition text to obtain a text word set, and matches the text words in the text word set with the description text of each sticker in the sticker library one by one. If the description text of the sticker matches the text word in all matching results, a sticker is randomly selected from the matching stickers as the target sticker. If there is no sticker description text matching the text word in all matching results, the video sticker processing is exited.

For example, the speech recognition text "hao kai xin" is cut from the front to the end, and the text word set {("hao", "kai", "xin"), ("hao kai", "xin"), ("hao", "kai xin"), ("hao kai xin")}. Match "hao", "kai", "xin", "hao kai", "kai xin", "hao kai xin" with the description text of each sticker in the sticker library. If the description text of the sticker matches the text word in all matching results, a sticker is randomly selected from the matching stickers as the target sticker. If there is no sticker description text matching the text word in all matching results, the video sticker processing is exited.

In a preferred implementation of this embodiment, a sticker is randomly selected from the matching results of text words with the longest text length as the target sticker.

For example, randomly select a sticker as the target sticker from the matching result of "hao kai xin".

As an example, after the speech recognition text is obtained, the server performs word cutting processing on the speech recognition text to obtain a text word set. According to the length of the text word text from long to short, matching the text words in the text word set with the description text of each sticker in the sticker library one by one. If the description text of the sticker matches the text word in the current matching result, a sticker is randomly selected from the matching stickers as the target sticker. If there is no sticker description text matching the text word in all matching results, the video sticker processing is exited.

For example, the speech recognition text "hao kai xin" is cut from the front to the end, and the text word set {("hao kai xin"), ("hao kai", "xin"), ("hao", "kai xin"), ("hao", "kai", "xin")}. Match "hao kai xin", "hao kai", "kai xin", "hao", "kai", "xin" with the description text of each sticker in the sticker library in sequence. If the description text of the sticker matches the text word in the current matching result, a sticker is randomly selected from the matching stickers as the target sticker. If there is no sticker description text matching the text word in all matching results, the video sticker processing is exited.

In this embodiment, by performing word cutting processing on the speech recognition text, the obtained text word is matched with the description text of each sticker in the sticker library to obtain a target sticker, which can effectively increase the success rate of sticker matching, thereby improving the efficiency of video sticker processing.

In a preferred implementation of this embodiment, after obtaining the text word set, the server can deliver the text word set to the user terminal, so that the user can confirm the text word set through the user terminal.

Wherein, the data structure of the text word set can be referred to: {(text word 1, startTime, endTime), (text word 2, startTime, endTime), . . . }, startTime represents the start time of the corresponding text word, endTime represents the end time of the corresponding text word.

In a preferred implementation of this embodiment, after the matching sticker is obtained, the server can deliver the matching sticker to the user terminal, so that the user can confirm the matching sticker through the user terminal.

Wherein, the data structure for delivering matching stickers can be referred to: {(text word 1: matching sticker 1), (text word 2, matching sticker 2), . . . }.

In a preferred embodiment, adding the target sticker to the default position or target position of the target video frame further comprises: when the appearance time of the target sticker at the default position or the target position reaches a preset threshold, removing the target sticker.

As an example, when the target sticker is added to the default position or target position of the target video frame, the length of appearance of the target sticker at the default position or target position is detected, and when the appearance time of the target sticker at the default position or the target position reaches a preset threshold, removing the target sticker from the target video frame. Wherein, the preset threshold is preset according to actual needs, such as 2 seconds.

In this embodiment, when the appearance time of the target sticker at the default position or the target position reaches a preset threshold, removing the target sticker can prevent the target sticker from staying too long in the default position or the target position to block the video content.

In a preferred embodiment, after performing face recognition and speech recognition on the video to be processed separately to obtain face position data when face recognition is successful, and speech recognition text when speech recognition is successful, the method further comprises: adding the speech recognition text at the subtitle position of the target video frame.

In this embodiment, the speech recognition text is added to the subtitle position of the target video frame, and the position where the subtitle is added can be automatically determined according to the speech recognition text, thereby improving the efficiency of video editing processing.

Figure 3:
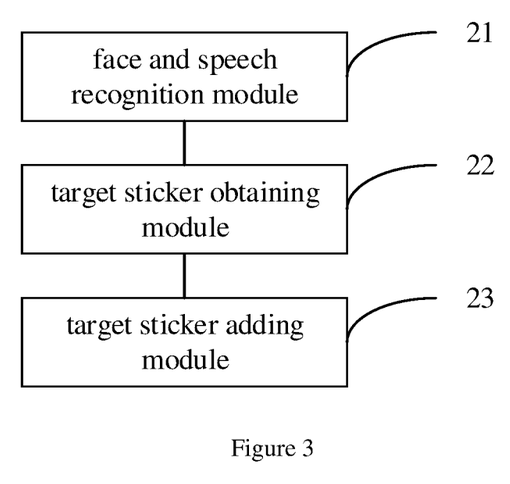
FIG. 3 is a schematic structural diagram of a video sticker processing device according to a second embodiment of the present invention.
Figure 4:
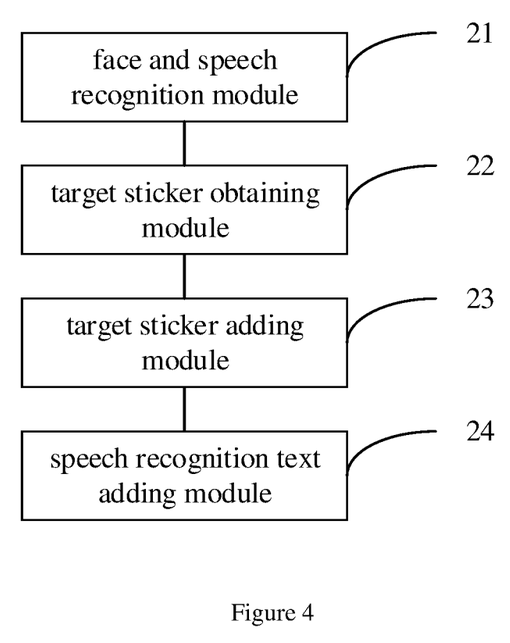
FIG. 4 is another schematic structural diagram of a video sticker processing device according to a second embodiment of the present invention.

Refer to FIGS. 3-4.

As shown in FIG. 3, a second embodiment provides a video sticker processing device, which comprises: face and speech recognition module 21, which is configured to perform face recognition and speech recognition on the video to be processed separately to obtain face position data when face recognition is successful, and speech recognition text when speech recognition is successful; target sticker obtaining module 22, which is configured to match the speech recognition text with the description text of each sticker in the sticker library to obtain a target sticker, and obtain a target video frame according to the speech recognition text; target sticker adding module 23, which is configured to add the target sticker to the default position or target position of the target video frame; wherein, the target position is calculated according to the face position data.

As an example, the user uploads the video to be processed through the user terminal, and the face and speech recognition module 21 performs face recognition and speech recognition on the video to be processed when receiving the video to be processed. When the face recognition is successful, the face position data can be obtained, and when the speech recognition is successful, the speech recognition text can be obtained. Wherein, user terminals comprise mobile phones, computers, tablets and other communication devices that can be connected to the server.

In a preferred implementation of this embodiment, after obtaining the speech recognition text, the face and speech recognition module 21 may deliver the speech recognition text to the user terminal, so that the user can confirm the speech recognition text through the user terminal.

When the speech recognition is successful, target sticker obtaining module 22 matches the speech recognition text with the description text of each sticker in the sticker library, and the sticker corresponding to the description text successfully matched with the speech recognition text is the target sticker. At the same time, through the target sticker obtaining module 22, the target video frame is obtained according to the speech recognition text.

In a preferred implementation of this embodiment, after obtaining the target sticker, the target sticker obtaining module 22 can deliver the target sticker to the user terminal, so that the user can confirm the target sticker through the user terminal. After obtaining the target video frame, the target sticker obtaining module 22 can deliver the target video frame to the user terminal, so that the user can confirm the target video frame through the user terminal.

After obtaining the target sticker and the target video frame, through the target sticker adding module 23, the location of the target sticker is determined by combining the face recognition result, that is, when face recognition fails, add the target sticker to the default position of the target video frame according to the preset position for the target sticker, and when the face recognition is successful, the target position is calculated according to the face position data, and the target sticker is added to the target position of the target video frame.

Wherein, the setting process of the default position can be referred to: when the face recognition of the video to be processed fails, that is, when the face cannot be recognized or the rectangular width of the face is less than 30% of the width of the mobile phone screen, first add a 300*380 default rectangle to the center of the phone screen, then draw the inscribed ellipse of the default rectangle, the point on the inscribed ellipse is the default effective point, and finally randomly select a default effective point from all the default effective points as the default position.

Wherein, the calculation process of the target position can refer to: when the face recognition of the video to be processed is successful, that is, the width of the face rectangle is greater than 30% of the width of the mobile phone screen, firstly, the width of the face rectangle is increased by 40%, the upper half of the face rectangle is increased by 60%, and the lower half of the face rectangle is increased by 30%, to ensure that the width of the entire face rectangle is not less than 65% of the width of the mobile phone screen. Then draw the inscribed ellipse of the face rectangle. The points on the ellipse are the spare points of the target sticker (equally divided into 8-10). The spare points outside the screen of the mobile phone are unavailable points, and the spare points inside the screen of the mobile phone are available points. Then add a default sticker at each available point (the width of the sticker is greater than 45% of the width of the face rectangle). When the default sticker placement area exceeds the mobile phone screen by 20%, the corresponding available point is an invalid point. When the default sticker placement area does not exceed 20% of the phone screen, the corresponding available point is the valid point. Finally, randomly select a valid point from all valid points as the target position. When there are less than 3 valid points, center one width=80% playerWidth, height=70% playerHeight (rectangle of safe area), at this time, it is necessary to judge whether the height of the center point of the rectangle is higher or lower than the height of the mobile phone screen 5%, if yes, determine the valid point in the reverse direction as the target position.

Wherein, the selection process of the rotation angle of the target sticker can refer to: when the target sticker is added on the left side of the mobile phone screen, the rotation angle is a random angle of 0-45° clockwise, if the target sticker is added on the right side of the mobile phone screen, the rotation angle is a random angle of 0-45° counterclockwise.

In a preferred implementation of this embodiment, after adding the target sticker to the default position or target position of the target video frame, the target sticker adding module 23 may deliver the target video frame with the target sticker added to the user terminal, so that the user can confirm the processing of the video sticker through the user terminal.

In this embodiment, through the face and speech recognition module 21, face recognition and speech recognition are performed on the video to be processed separately to obtain face position data when the face recognition is successful, and speech recognition text is obtained when the speech recognition is successful, and then, through the target sticker obtaining module 22, the speech recognition text is matched with the description text of each sticker in the sticker library to obtain the target sticker, and the target video frame is obtained according to the speech recognition text, thereby through the target sticker adding module 23, add a target sticker to the default position or the target position calculated based on the face position data of the target video frame to complete the video sticker processing.

In this embodiment, by performing face recognition and speech recognition on the video to be processed, when the speech recognition is successful, the speech recognition text is matched with the description text of each sticker in the sticker library to obtain the target sticker, and the target video frame is obtained according to the voice recognition text. When face recognition fails, add the target sticker to the default position of the target video frame according to the default position preset for the target sticker, and when the face recognition is successful, the target position is calculated according to the face position data, and the target sticker is added to the target position of the target video frame. The embodiment of the present invention can automatically determine the target sticker and its added position according to the face recognition result and the speech recognition result of the video to be processed, realize the intelligent selection and placement of the target sticker, and improve the processing efficiency of the video sticker.

In a preferred embodiment, performing face recognition and speech recognition on the video to be processed separately to obtain face position data when face recognition is successful, and speech recognition text when speech recognition is successful, specifically as follows: performing face recognition on the video frames of the video to be processed in sequence, and when face recognition is successful in a video frame, obtaining the face position data of the corresponding video frame; performing speech recognition on the video to be processed, and when speech recognition is successful, convert the recognized speech data into text data to obtain the speech recognition text.

As an example, the user records the video to be processed through the user terminal, uploads the video frames of the video to be processed, and when the face and speech recognition module 21 receives the video frames of the video to be processed, the video frames of the video to be processed are sequentially subjected to face recognition according to the order of receiving the video frames of the video to be processed. If the face recognition of a video frame is successful, it is determined that the face recognition of the video to be processed is successful, and the face position data of the video frame is obtained. If face recognition fails for all video frames, it is determined that face recognition of the video to be processed has failed. The user finishes recording the video to be processed through the user terminal and uploads the last video frame of the video to be processed. When receiving the last video frame, the face and speech recognition module 21 performs speech recognition on the video to be processed. If the speech recognition is successful, the recognized speech data is converted into text data to obtain the speech recognition text. If the speech recognition fails, the video sticker processing is exited.

In this embodiment, through the face and speech recognition module 21, face recognition is performed on the video frames of the video to be processed in sequence, and the face position data of the corresponding video frame is obtained when the face recognition of a video frame is successful, so that when the user records the video to be processed, it can perform face recognition on the received video frame, and after obtaining the face position data, there is no need to perform face recognition on the remaining video frames, which greatly shortens the time of processing face recognition of the video to be processed, thereby improving the efficiency of video sticker processing.

In a preferred embodiment, matching the speech recognition text with the description text of each sticker in the sticker library to obtain a target sticker, and obtaining a target video frame according to the speech recognition text, specifically as follows: matching the text word obtained by cutting the speech recognition text with the description text of each sticker in the sticker library to obtain the target sticker; obtaining the appearance time of the speech recognition text in the video to be processed, and taking a video frame whose playback time corresponds to the appearance time as the target video frame.

As an example, after the speech recognition text is obtained, the target sticker obtaining module 22 performs word cutting on the speech recognition text to obtain a text word set, and matches the text words in the text word set with the description text of each sticker in the sticker library one by one. If the description text of the sticker matches the text word in all matching results, a sticker is randomly selected from the matching stickers as the target sticker. If there is no sticker description text matching the text word in all matching results, the video sticker processing is exited.

For example, the speech recognition text "hao kai xin" is cut from the front to the end, and the text word set {("hao", "kai", "xin"), ("hao kai", "xin"), ("hao", "kai xin"), ("hao kai xin")}. Match "hao", "kai", "xin", "hao kai", "kai xin", "hao kai xin" with the description text of each sticker in the sticker library. If the description text of the sticker matches the text word in all matching results, a sticker is randomly selected from the matching stickers as the target sticker. If there is no sticker description text matching the text word in all matching results, the video sticker processing is exited.

In a preferred implementation of this embodiment, a sticker is randomly selected from the matching results of text words with the longest text length as the target sticker.

For example, randomly select a sticker as the target sticker from the matching result of "hao kai xin".

As an example, after the speech recognition text is obtained, the target sticker obtaining module 22 performs word cutting processing on the speech recognition text to obtain a text word set. According to the length of the text word text from long to short, matching the text words in the text word set with the description text of each sticker in the sticker library one by one. If the description text of the sticker matches the text word in the current matching result, a sticker is randomly selected from the matching stickers as the target sticker. If there is no sticker description text matching the text word in all matching results, the video sticker processing is exited.

For example, the speech recognition text "hao kai xin" is cut from the front to the end, and the text word set {("hao kai xin"), ("hao kai", "xin"), ("hao", "kai xin"), ("hao", "kai", "xin")}. Match "hao kai xin", "hao kai", "kai xin", "hao", "kai", "xin" with the description text of each sticker in the sticker library in sequence. If the description text of the sticker matches the text word in the current matching result, a sticker is randomly selected from the matching stickers as the target sticker. If there is no sticker description text matching the text word in all matching results, the video sticker processing is exited.

In this embodiment, through the target sticker obtaining module 22, by performing word cutting processing on the speech recognition text, the obtained text word is matched with the description text of each sticker in the sticker library to obtain a target sticker, which can effectively increase the success rate of sticker matching, thereby improving the efficiency of video sticker processing.

In a preferred implementation of this embodiment, after obtaining the text word set, the target sticker obtaining module 22 can deliver the text word set to the user terminal, so that the user can confirm the text word set through the user terminal.

Wherein, the data structure of the text word set can be referred to: {(text word 1, startTime, endTime), (text word 2, startTime, endTime), . . . }, startTime represents the start time of the corresponding text word, endTime represents the end time of the corresponding text word.

In a preferred implementation of this embodiment, after the matching sticker is obtained, the target sticker obtaining module 22 can deliver the matching sticker to the user terminal, so that the user can confirm the matching sticker through the user terminal.

Wherein, the data structure for delivering matching stickers can be referred to: {(text word 1: matching sticker 1), (text word 2, matching sticker 2), . . . }.

In a preferred embodiment, the target sticker adding module 23 is also configured to when the appearance time of the target sticker at the default position or the target position reaches a preset threshold, remove the target sticker.

As an example, when the target sticker is added to the default position or target position of the target video frame, the length of appearance of the target sticker at the default position or target position is detected, and when the appearance time of the target sticker at the default position or the target position reaches a preset threshold, removing the target sticker from the target video frame. Wherein, the preset threshold is preset according to actual needs, such as 2 seconds.

In this embodiment, through the target sticker adding module 23, when the appearance time of the target sticker at the default position or the target position reaches a preset threshold, removing the target sticker can prevent the target sticker from staying too long in the default position or the target position to block the video content.

As shown in FIG. 4, in the preferred embodiment, the video sticker processing device further comprises speech recognition text adding module 24, which is configured to after performing face recognition and speech recognition on the video to be processed separately to obtain face position data when face recognition is successful, and speech recognition text when speech recognition is successful, add the speech recognition text at the subtitle position of the target video frame.

In this embodiment, through the speech recognition text adding module 24, the speech recognition text is added to the subtitle position of the target video frame, and the position where the subtitle is added can be automatically determined according to the speech recognition text, thereby improving the efficiency of video editing processing.

In the present invention, the face and speech recognition module, target sticker obtaining module, target sticker adding module, and speech recognition text adding module can be one or more processors or processing chips. If necessary, they can also comprise memory, related interfaces, system transmission buses, and even input/output devices, display devices, communication devices, and so on. Among them, the processor executes the code related to the program to realize the corresponding function. The communication device may use a wireless communication device, wherein the wireless communication device may use a Wi-Fi transmission device, a Bluetooth transmission device, a Zigbee transmission device, a radio frequency transmission device, etc., which are well-known in the communication field.

In summary, the embodiments of the present invention have the following beneficial effects:

the embodiments of the present invention perform face recognition and speech recognition on the video to be processed separately to obtain face position data when face recognition is successful, and speech recognition text when speech recognition is successful, and then match the speech recognition text with the description of each sticker in the sticker library to obtain the target sticker, and the target video frame is obtained according to the speech recognition text, so that the target sticker is added at the default position of the target video frame or the target position obtained by calculating the face position data to complete the video sticker processing. The embodiments of the present invention perform face recognition and speech recognition on the video to be processed, so that when the speech recognition is successful, the speech recognition text is matched with the description text of each sticker in the sticker library to obtain the target sticker, and obtain the target video frame according to the speech recognition text. When face recognition fails, add the target sticker to the default position of the target video frame according to the preset position for the target sticker. When the face recognition is successful, the target position is calculated according to the face position data, and the target sticker is added to the target position of the target video frame. The embodiment of the present invention can automatically determine the target sticker and its added position according to the face recognition result and the speech recognition result of the video to be processed, realize the intelligent selection and placement of the target sticker, and improve the processing efficiency of the video sticker.

The above-mentioned embodiments are the preferred embodiments of the present invention. Variations and modifications are allowed within the scope of the invention. Those skilled in the art will appreciate that the features described above can be combined in various ways to form multiple variations of the invention. As a result, such variations fall within the scope of the protection to the present invention.

It can be understood by those skilled in the art that the whole or part of the flow in the method of the above embodiments can be realized by instructing related hardware through a computer program. The program can be stored in a computer readable storage medium, and at the time of execution, the program may include processes as described in the above embodiments. Among them, the storage medium can be disk, optical disc, Read-Only Memory (ROM) or Random Access Memory (RAM), etc.

The invention claimed is:

1. A video sticker processing method, wherein the method comprises:
   performing face recognition and speech recognition on a video to be processed separately to obtain face position data when the face recognition is successful, and a speech recognition text when the speech recognition is successful;
   matching the speech recognition text with a description text of each sticker in a sticker library to obtain a target sticker, and obtaining a target video frame according to the speech recognition text;
   adding the target sticker to a default position or a target position of the target video frame;
   wherein, the default position is obtained according to a preset position for the target sticker when the face recognition fails, the target position is calculated according to the face position data.

2. The video sticker processing method according to claim 1, wherein performing face recognition and speech recognition on a video to be processed separately to obtain face position data when the face recognition is successful, and a speech recognition text when the speech recognition is successful, specifically, are as follows:
   performing the face recognition on the video frames of the video to be processed in sequence, and when the face recognition is successful in a video frame, obtaining the face position data of the corresponding video frame;
   performing the speech recognition on the video to be processed, and when the speech recognition is successful, convert recognized speech data into text data to obtain the speech recognition text.

3. The video sticker processing method according to claim 1, wherein matching the speech recognition text with a description text of each sticker in sticker library to obtain a target sticker, and obtaining a target video frame according to the speech recognition text, specifically, are as follows:
   matching a text word obtained by cutting the speech recognition text with the description text of each sticker in the sticker library to obtain the target sticker;
   obtaining appearance time of the speech recognition text in the video to be processed, and taking a video frame whose playback time corresponds to the appearance time as the target video frame.

4. The video sticker processing method according to claim 1, wherein adding the target sticker to the default position or a target position of the target video frame further comprises:
   when the appearance time of the target sticker at the default position or the target position reaches a preset threshold, removing the target sticker.

5. The video sticker processing method according to claim 1, wherein after performing face recognition and speech recognition on video to be processed separately to obtain face position data when the face recognition is successful, and a speech recognition text when the speech recognition is successful, the method further comprises:
   adding the speech recognition text at a subtitle position of the target video frame.

6. A video sticker processing device, wherein the device comprises:
   a face and speech recognition module, which is configured to perform face recognition and speech recognition on a video to be processed separately to obtain face position data when the face recognition is successful, and a speech recognition text when speech recognition is successful;

a target sticker obtaining module, which is configured to match the speech recognition text with a description text of each sticker in a sticker library to obtain a target sticker, and obtain a target video frame according to the speech recognition text;

a target sticker adding module, which is configured to add the target sticker to a default position or a target position of the target video frame; wherein, the default position is obtained according to a preset position for the target sticker when the face recognition fails, the target position is calculated according to the face position data.

7. The video sticker processing device according to claim 6, wherein performing face recognition and speech recognition on a video to be processed separately to obtain face position data when the face recognition is successful, and a speech recognition text when the speech recognition is successful, specifically, are as follows:

performing the face recognition on the video frames of the video to be processed in sequence, and when the face recognition is successful in a video frame, obtaining the face position data of the corresponding video frame;

performing the speech recognition on the video to be processed, and when the speech recognition is successful, convert recognized speech data into text data to obtain the speech recognition text.

8. The video sticker processing device according to claim 6, wherein matching the speech recognition text with a description text of each sticker in a sticker library to obtain a target sticker, and obtaining a target video frame according to the speech recognition text, specifically, are as follows:

matching a text word obtained by cutting the speech recognition text with the description text of each sticker in the sticker library to obtain the target sticker;

obtaining appearance time of the speech recognition text in the video to be processed, and taking a video frame whose playback time corresponds to the appearance time as the target video frame.

9. The video sticker processing device according to claim 6, wherein the target sticker adding module is also configured to when the appearance time of the target sticker at the default position or the target position reaches a preset threshold, remove the target sticker.

10. The video sticker processing device according to claim 6, wherein the device further comprises:

a speech recognition text adding module, which is configured to after performing the face recognition and the speech recognition on the video to be processed separately to obtain the face position data when the face recognition is successful, and the speech recognition text when the speech recognition is successful, add the speech recognition text at a subtitle position of the target video frame.

* * * * *